(12) United States Patent
Roose

(10) Patent No.: US 8,002,074 B2
(45) Date of Patent: Aug. 23, 2011

(54) CENTER-PIVOT STEERING ARTICULATED VEHICLE

(75) Inventor: Gerald L. Roose, Pella, IA (US)

(73) Assignee: Roose Mfg. Company, Pella, IA (US)

( * ) Notice: Subject to any disclaimer, the term of this patent is extended or adjusted under 35 U.S.C. 154(b) by 50 days.

(21) Appl. No.: 12/509,838

(22) Filed: Jul. 27, 2009

(65) Prior Publication Data

US 2011/0018230 A1   Jan. 27, 2011

(51) Int. Cl.
*B60D 5/06* (2006.01)
*B62D 13/02* (2006.01)
(52) U.S. Cl. ......... 180/418; 180/420; 180/419; 180/421
(58) Field of Classification Search ................... 180/418, 180/420, 419, 421
See application file for complete search history.

(56) References Cited

U.S. PATENT DOCUMENTS

| | | | | |
|---|---|---|---|---|
| 3,807,586 | A * | 4/1974 | Holopainen | 414/694 |
| 5,154,439 | A * | 10/1992 | Weyer | 280/468 |
| 5,632,350 | A | 5/1997 | Gauvin | |
| 5,908,081 | A | 6/1999 | Olson | |
| 5,934,320 | A * | 8/1999 | O'Reilly et al. | 137/625.21 |
| 6,116,697 | A * | 9/2000 | Smith et al. | 298/22 R |
| 6,158,544 | A * | 12/2000 | Dvorak et al. | 180/418 |
| 6,213,490 | B1 * | 4/2001 | Lykken et al. | 280/442 |
| 6,464,427 | B1 * | 10/2002 | Gottschling et al. | 404/117 |
| 6,715,579 | B1 * | 4/2004 | Hendron | 280/764.1 |
| 7,401,860 | B2 * | 7/2008 | Kraenzle | 298/12 |
| 7,611,321 | B1 * | 11/2009 | Cooper | 414/475 |
| 7,770,909 | B2 * | 8/2010 | Anderson et al. | 280/432 |
| 2007/0145809 | A1 * | 6/2007 | Timoney et al. | 298/22 P |

OTHER PUBLICATIONS

"3-Wheel Tractor Sprayer Attachments", www.agriweld.com/pages/applicator_3W6410.html. article and close-up of the steering unit.

* cited by examiner

*Primary Examiner* — Paul N Dickson
*Assistant Examiner* — Marlon A Arce
(74) *Attorney, Agent, or Firm* — McKee, Voorhees & Sease, P.L.C.

(57) ABSTRACT

The center-pivot vehicle has forward and rearward sections with traversing means for traversing terrain. A rotary actuator connects the forward and rearward sections. Rotation of the rotary actuator articulates the forward and rearward sections relative to each other for steering the vehicle. The present invention also includes a method for controlling articulation of a center-pivot vehicle which includes connecting first and second sections of the center-pivot vehicle together with a rotary actuator, powering the rotary actuator with an engine and providing a steering input by an operator for operating the rotary actuator for rotating the rotary actuator and articulating the first and second sections of the vehicle relative to each other for turning the vehicle.

19 Claims, 3 Drawing Sheets

CENTER-PIVOT STEERING ARTICULATED VEHICLE

FIELD OF THE INVENTION

The present invention relates to an apparatus and method for a center-pivot vehicle. More specifically, the present invention relates to an apparatus and method for articulating a center-pivot vehicle.

BACKGROUND OF THE INVENTION

It is well-known that center-pivot vehicles have the advantage of being extremely maneuverable. Other advantages of center-pivot vehicles include exact steering geometries, rear wheels tract with front wheels, tighter turning radius over common axle pivot steering, and the ability to move the forward and rearward sections even if the vehicle is not moving.

Typically, center-pivot vehicles have forward and rearward sections hinged together. Articulation of the sections is often provided by one or more hydraulic cylinders. For example, one cylinder on one side of the hinge expands while another cylinder on the opposite side of the hinge contracts for articulating the forward section relative to the rearward section for turning the vehicle.

Current systems for providing center-pivoting of a vehicle are bulky, have limited operating parameters, require an excessive amount of power to operate, and are expensive to build and to operate. Because of the interlinking between the forward and rearward sections, this type of center-pivot system limits the operating independency of the forward and rearward sections, which in turn limits the stability of these sections and the amount each is able to pitch and roll relative to the other. Invariably, the ability of the forward and rearward sections of a center-pivot vehicle to pitch and roll freely is retarded by the structure or functionality providing center-pivoting.

Therefore, it is a primary object, feature or advantage of the present invention to improve over the state of the art.

It is a further object, feature or advantage of the present invention to provide an apparatus and method for a center-pivot steering articulated vehicle wherein the system providing articulation is non-bulky, inexpensive to build, operate and maintain.

Yet another object, feature or advantage of the present invention is to provide an apparatus and method for a center-pivot steering articulated vehicle wherein the system providing articulation has limited moving parts interlinking forward and rearward sections of the vehicle.

A further object, feature or advantage of the present invention is to provide an apparatus and method for a center-pivot steering articulated vehicle wherein the system providing articulation has a minimal power requirement.

Another object, feature or advantage of the present invention is to provide an apparatus and method for a center-pivot steering articulated vehicle wherein the system providing articulation provides operating independency of forward and rearward sections for increased stability, tracking, and handling.

Yet another object, feature or advantage of the present invention is to provide an apparatus and method for a center-pivot steering articulated vehicle wherein the system providing articulation allows for forward and rearward section dependency whereby both sections remain solidly grounded and true to the terrain regardless of the terrain.

A further object, feature or advantage of the present invention is to provide an apparatus and method for a center-pivot steering articulated vehicle wherein the pitch and roll of the forward and rearward sections are independent of articulation of the forward and rearward sections.

Another object, feature or advantage of the present invention is to provide an apparatus and method for a center-pivot steering articulated vehicle wherein the system providing articulation is a single self-contained unit for simplicity, cost savings and ease of operation and troubleshooting.

One or more of these and/or other objects, features, or advantages of the present invention will become apparent from the specification and claims that follow.

BRIEF SUMMARY OF THE INVENTION

According to one aspect of the present invention, a center-pivot vehicle is disclosed. The vehicle includes a forward section having traversing means for traversing terrain and a rearward section having traversing means for traversing terrain. The vehicle also includes a rotary actuator connecting the forward and rearward sections. Rotation of the rotary actuator articulates the forward and rearward sections relative to each other for steering the vehicle. In a preferred form, the forward or rearward section of the vehicle includes an operator station. The operator station includes a steering control in communication with the rotary actuator for communicating an operator's instructions to the rotary actuator for turning the vehicle. The steering control may include a steering wheel, a joy stick, or left and right hand controls. The rotary actuator is preferably a hydraulic rotary actuator. A spindle and hub is connected between the forward or rearward sections and the rotary actuator to allow the forward and rearward sections to pitch and roll relative to each other. The forward or rearward sections may include a working body such as a flat bed, or a box that may be hydraulically operated.

A new method for controlling articulation of a center-pivot vehicle is disclosed. The method includes connecting first and second sections of the center-pivot vehicle together with a rotary actuator, powering the rotary actuator by an engine associated with the first or second sections, providing a steering input by an operator into the rotary actuator for rotating the rotary actuator, and articulating the first and second sections relative to each other for steering the vehicle by rotating the rotary actuator. In a preferred form, the method also includes the rotary actuator being a hydraulic rotary actuator. The method also includes operating a hydraulic steering unit for providing steering input into the hydraulic rotary actuator.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENT

The present invention includes a number of aspects, all of which have broad and far-reaching application. One aspect of the present invention relates to an apparatus and method for a center-pivot steering articulated vehicle wherein the system providing articulation of forward and rearward sections relative to each other is a rotary actuator. Another aspect of the present invention relates to an apparatus and method for a center-pivot steering articulated vehicle wherein the system providing articulation of the forward and rearward sections relative to each other is provided by a hydraulic rotary actuator. Still another aspect of the present invention relates to an apparatus and method for a center-pivot steering articulated vehicle wherein the system providing articulation allows the forward and rearward sections of the vehicle to operate and function nearly independently of each other for increased stability, tracking and handling whereby separate sections of the vehicle remain solidly grounded and true to the terrain. The present invention contemplates numerous other options in the design and use of the center-pivot steering articulated vehicle.

Apparatus

Figure 1:
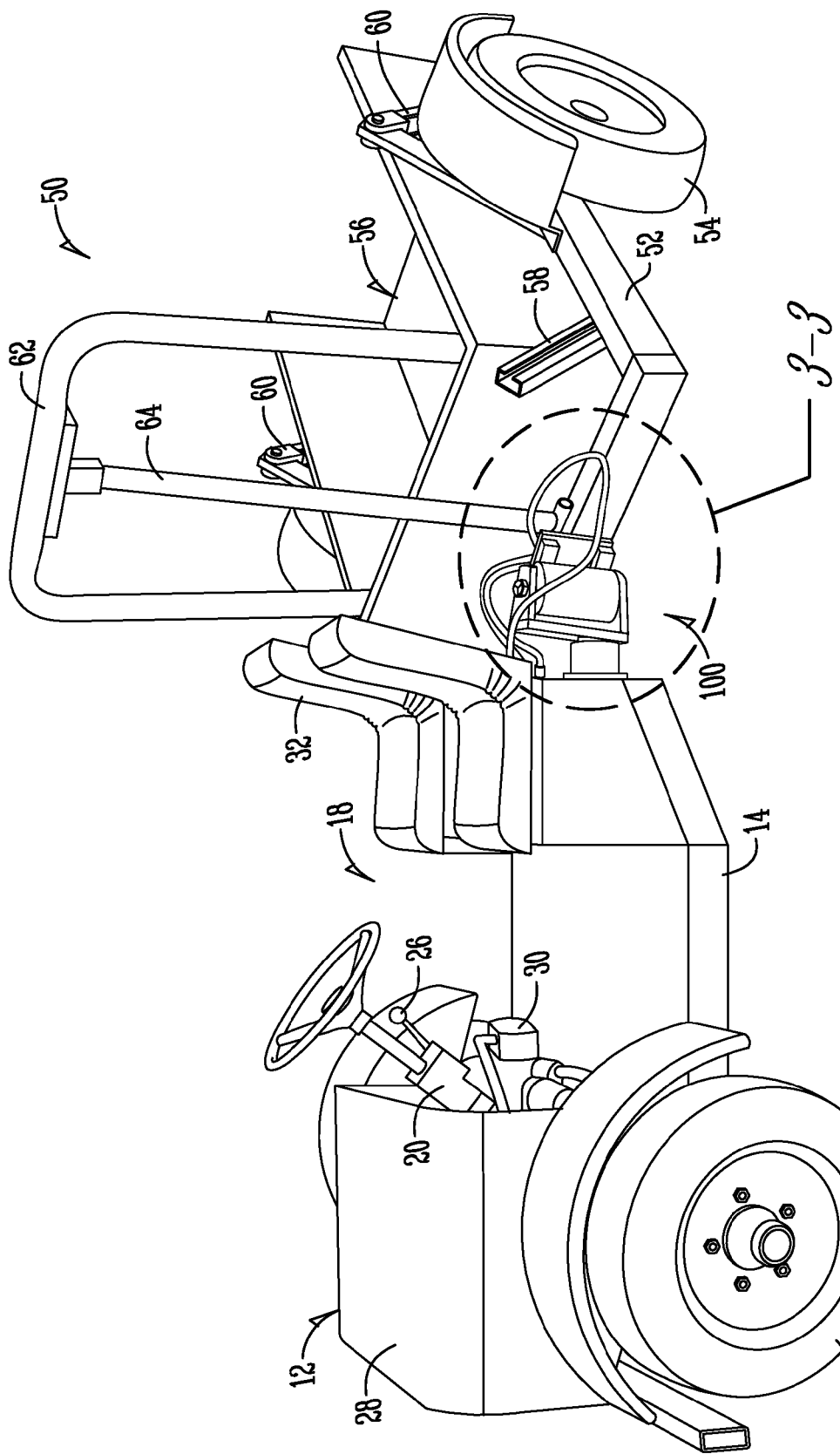
FIG. 1 is a perspective view of an exemplary embodiment of the center-pivot vehicle.
Figure 2:
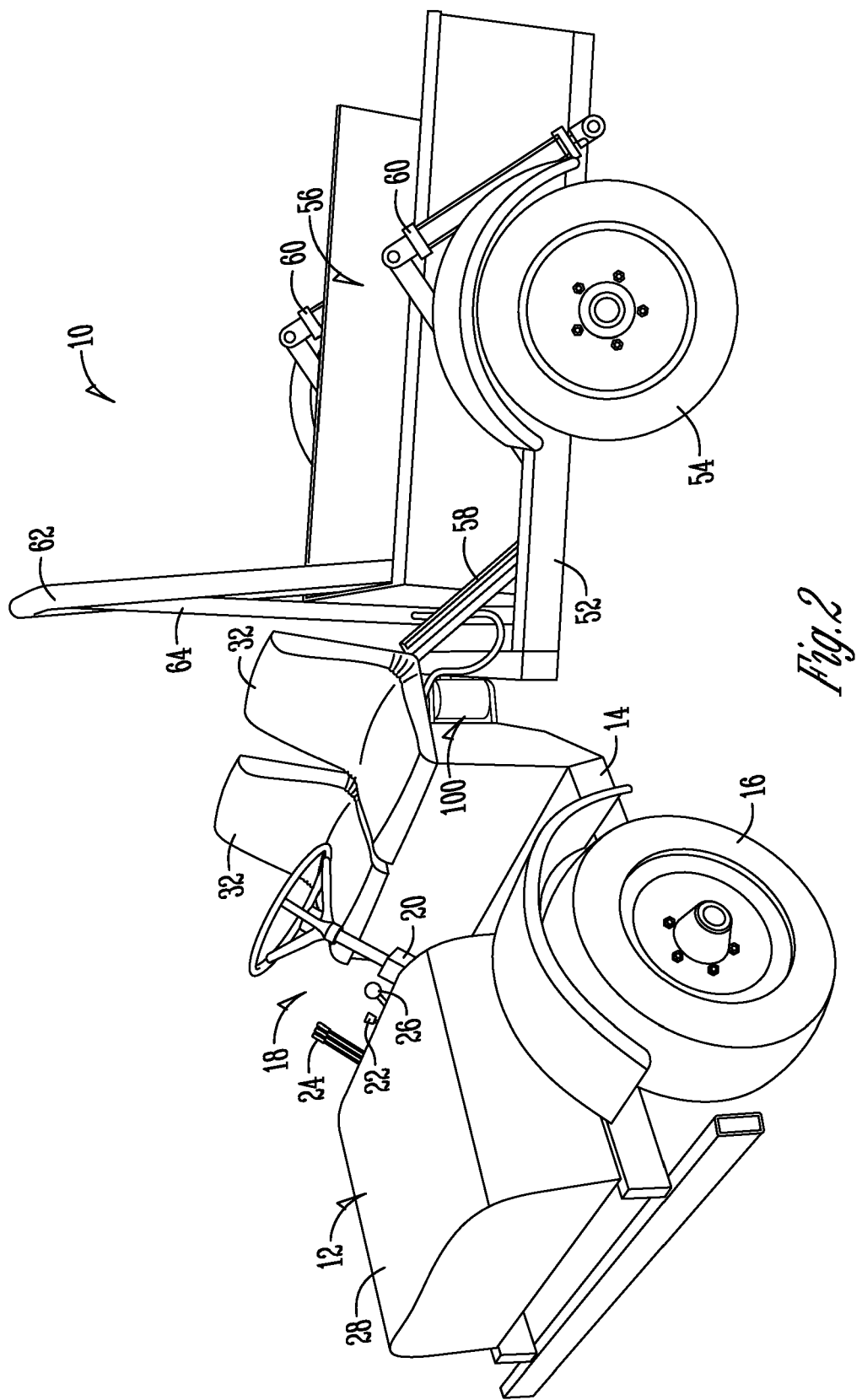
FIG. 2 is another perspective view of the center-pivot vehicle according to an exemplary aspect of the present invention.
Figure 3:
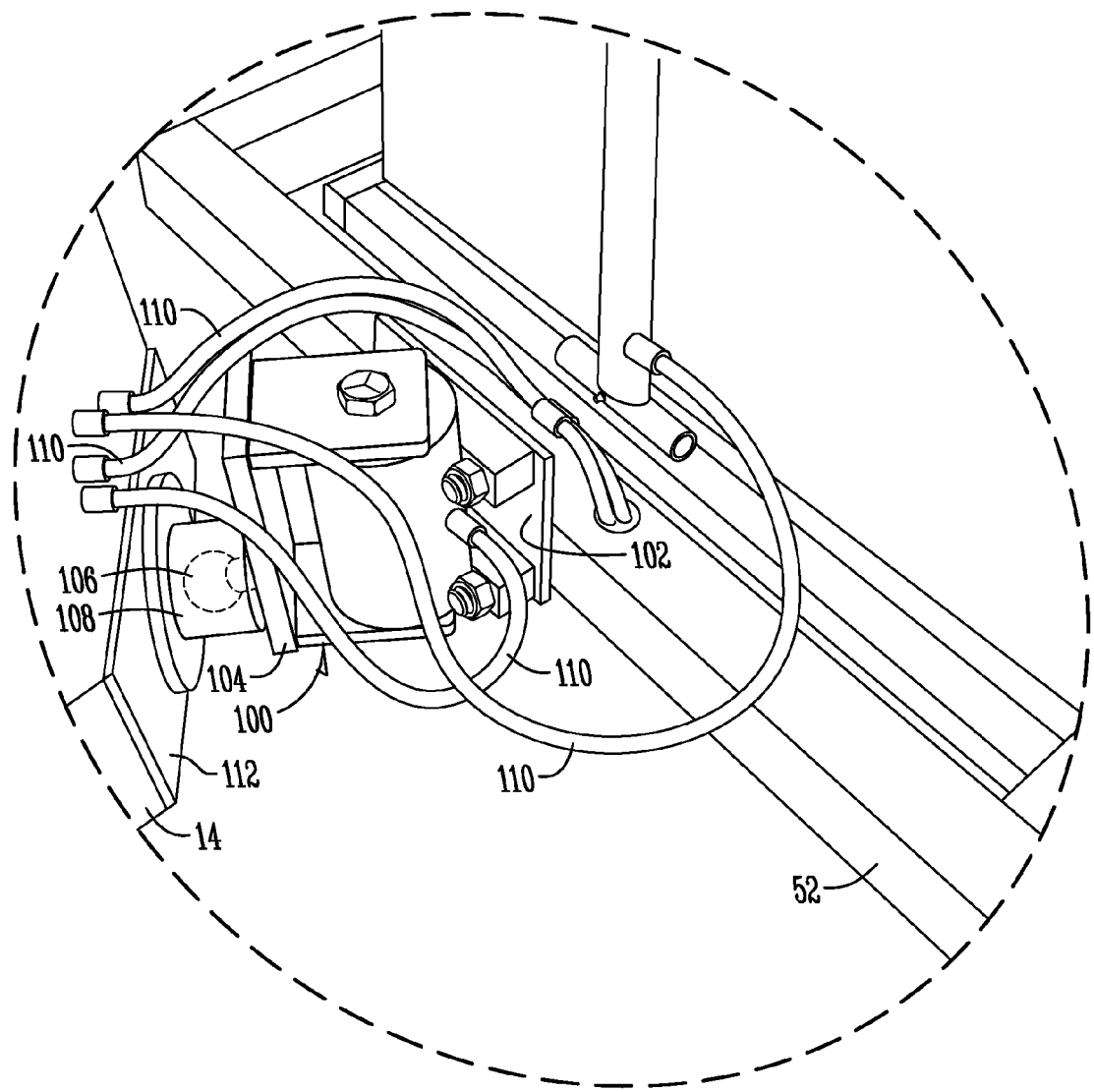
FIG. 3 is a section view taken along line 3-3 in FIG. 1.

Apparatuses of the present invention are shown by exemplary embodiments illustrated in FIGS. 1-3. FIGS. 1-2 provide perspective views of the center-pivot vehicle 10 according to exemplary aspects of the present invention. The center-pivot vehicle 10 includes generally a forward section 12 having traversing means 16. The forward section 12 is operatively joined or connected to a rearward section 50 also having traversing means 54. Forward section 12 and rearward section 50 are connected together by a rotary actuator 100 which, when actuated, causes forward section 12 and rearward section 50 to articulate relative to each other to provide turning for vehicle 10. As best illustrated in FIGS. 1-2, the forward section 12, or first wheel supported section in one embodiment of the invention, is supported by frame 14. Frame 14 preferably is constructed from square steel tubing, but may be fabricated from other materials such as aluminum. Frame 14 could also be fabricated from other assorted material types and materials, such as pipe, I-beams, angle iron, plate steel, round bar, whether in steel, aluminum or another material type suitable for bearing the loads and stresses of center-pivot vehicle 10. Frame 14 is supported by traversing means 16. In a preferred embodiment, traversing means includes a rim and tire assembly as shown in FIGS. 1-2. The present invention contemplates other traversing means such as a track assembly or ski's for traversing various types of terrain during various seasons. The forward section 12 is shown having an operator's station 18. It should be appreciated that the present invention is sufficiently flexible to allow for components and functionality configured into the forward section 12 to be part of the rearward section 50; components and functionality configured into the rearward section 50 may be configured or fabricated into the forward section 12 depending upon the desired design and functionality of the center-pivot vehicle 10. In one embodiment, the forward section 12 as shown in FIGS. 1-2 includes an engine 28 and an operator's station 18. The engine 28 may be an electric or combustion engine. In the case where the engine is electric, an appropriate onboard and rechargeable power source could be supported by either the forward section 12 or rearward section 50 for providing electrical current to the motor. Preferably, engine 28 is a diesel or gas combustion engine. Engine 28 may include hydraulic pump 30 for providing a working fluid to perform one or more functions. In the case where engine 28 includes hydraulic pump 30, traversing means 16 may be hydrostatically driven. The operator's station 18 may include one or more controls such as a drive engager 26 for engaging hydrostatic clutch and providing a driving force to traversing means 16. Other controls such as throttle 22 may be provided for controlling engine 28. The operator's station 18 includes one or more seats 32 for positioning an operator proximate vehicle controls. Preferably, operator's station 18 includes a steering control 20 whereby the operator provides instructional input for articulating the forward section 12 and rearward section 50 relative to each other for turning vehicle 10. In a preferred form, steering control 20 comprises an orbital power hydraulic steering unit (see hydraulic steering control units, Eaton Corporation, Eaton Center, 1111 Superior Avenue, Cleveland, Ohio). Steering control 20 is in operable communication with hydraulic pump 30 and rotary actuator 100 whereby working fluid, such as hydraulic fluid, may be communicated from steering control 20 and hydraulic pump to rotary actuator 100. Steering control 20 may include other steering controls such as a joy stick or left and right hand controls. Other operator controls may be positioned within operator's station 18 for controlling one or more functions of vehicle 10.

As shown in FIGS. 1-2, rearward section 50 (or second wheel supported section in one embodiment) provides some working functionality for center-pivot vehicle 10. As previously expressed, the working functionality associated with rearward section 50 could be interchanged with forward section 12 whereby the rearward section 50 includes the operator station 18 and the forward section 12 includes some working functionality. Rearward section 50 includes a frame 52. Like frame 14, frame 52 may be fabricated of like materials and material types. Frame 52 is supported by traversing means 54. In a preferred form, traversing means 54 includes a rim and wheel assembly as shown. In the case of a rim and wheel assembly being used for traversing means 54, one or both sections (forward and/or rearward sections 12, 50) could be supported by more than one pair of wheels or more than a single axle. For example, the forward section 12 could be supported by a single or dual pair of wheels in a single or multiple axle configuration. Similarly, the rearward section could be supported by a single or dual pair of wheels in a single or multiple axle configuration. As with the forward section 12, the rearward section 50 may include any number of traversing means 54, such as a track or ski for traversing various types of terrain during various seasons. Vehicle 10 may be configured whereby traversing means 54 and/or traversing means 16 provide a driving force for moving vehicle 10. For example, traversing means 54 could be configured to be driven hydrostatically not unlike traversing means 16 of the forward section 12. Whether the rearward section 50 or forward section 12 include some working functionality, such working functionality may include a working body 56. Working body 56 may include any number of working elements. For example, working body 56 may include a flat bed or a box. The working body 56 may be actuated to provide additional functionality. For example, working body 56 may be hydraulically actuated whereby the box or flat bed may be raised, lowered or tilted relative to frame 52. Guide rails 58 and hydraulic cylinders 60 and 64 may be attached to frame 52 and working body 56 to thereby actuate working body 56 for providing additional functionality. For example, working body 56 may be raised and lowered as shown and described in commonly owned U.S. Pat. No. 7,044,704 to Roose, which is incorporated herein by reference in its entirety. Rearward section 50 may also include a roll bar 62 attached to working body 56. Hydraulic cylinder 64 may be attached between roll bar 62 and working body frame 66 whereby actuating hydraulic cylinder 64 tilts working body 56 and working body frame 66 relative to frame 52 for loading and unloading working body 56. Additionally, hydraulic cylinder 60 may be attached to frame 52 and working body 56 to raise and lower working body 56 relative to frame 52.

As previously discussed, forward section 12 and rearward section 50 are connected by rotary actuator 100. Rotary actuator 100 may be hydraulically, pneumatically, mechanically, or electrically driven. Preferably, rotary actuator 100 is a hydraulic rotary actuator (see Helac Corporation, 225 Battersby Avenue, Enumclaw, Wash.). The structure and function of a hydraulic rotary actuator is disclosed in U.S. Pat. No. 4,422,366, which is incorporated by reference herein. Rotary actuator 100 is attached to frame 52 of rearward section 50 by mounting plate 102. Rotary actuator 100 includes a pivot bracket 104 that upon actuation of rotary actuator 100 turns or rotates relative to rotary actuator 100. In a preferred form, a spindle and hub assembly is connected between pivot bracket 104 and frame 14 of forward section 12. Hub 108 may be attached to a mounting plate 112 secured to frame 14 of forward section 12. The spindle and hub assembly could alternatively be connected between rotary actuator 100 and mounting plate 102. The spindle and hub assembly includes a spindle 106 that is received within hub 108. The spindle and hub assembly allows the rearward section 50 to pitch and roll relative to the forward section 12, thus the rearward section 50 is able to pitch and roll independent of the pitch and roll experienced by the forward section 12. In other words, the rearward section 50 is able to float relative to the forward section 12 and vice versa. For example, in the case where the terrain differs between the forward and rearward sections 12, 50, both sections are able to independently pitch or roll to allow the traversing means to remain solidly grounded and true to the terrain. The independency of the forward section 12 and rearward section 50 provides increased stability, tracking and handling. This design also prevents the wear and tear which ordinarily would be experienced at the connective point between the rearward section and forward section of a center-pivot vehicle. In the case where rotary actuator 100 is a hydraulic rotary actuator, hydraulic lines 110 from hydraulic pump 30 provide working hydraulic fluid to rotary actuator 100. Operator input into steering control 20 causes working fluid from hydraulic pump 30 to articulate or rotate pivot bracket 104 relative to rotary actuator 100 which in turn causes forward section 12 and rearward section 50 to articulate relative to each other for steering vehicle 10. For example, if an operator's input into steering control 20 is a clockwise turn of the wheel, working hydraulic fluid activates rotary actuator so as to rotate pivot bracket 104 clockwise to perform a right hand turn. Alternatively, if an operator provides a counterclockwise input into the wheel of steering control 20, hydraulic working fluid is communicated from hydraulic pump 30 to rotary actuator 100 to cause pivot bracket 104 to rotate counterclockwise to perform a left hand turn. Additional hydraulic lines 110 may be provided for communicating working hydraulic fluid to hydraulic cylinder 60 and 64 for operating working body 56 of rearward section 50. Working body controls 24 may be positioned at operator station 18 of forward section 12 for receiving operator input and for controlling working body 56.

Methods

FIGS. 1-3 illustrate a method for controlling articulation of center-pivot vehicle 10. The method includes connecting forward section 12 and rearward section 50 of center-pivot vehicle 10 together using a rotary actuator 100. The method also includes the step of powering the rotary actuator 100 with engine 28. In a preferred form, engine 28 also includes a hydraulic pump 30 for providing a hydraulic working fluid to rotary actuator 100 for turning or rotating pivot bracket 104.

A steering control 20 is provided at an operator station 18 of vehicle 10 whereby operator input into steering control 20 is communicated to rotary actuator 100. Operator input at steering control 20 communicated to rotary actuator 100 causes rotary actuator 100 to rotate or turn pivot bracket 104 clockwise or counter-clockwise depending upon the input by the operator at steering control 20. In a preferred form, the steering control 20 includes a hydraulic steering unit for controlling a hydraulic rotary actuator. In operation, an operator provides input through controls at the operator station 18 for controlling engine 28, rotary actuator 100 and working body 56. Operator's instructions for controlling the engine may be provided through standard controls such as throttle 22. Operator's instructions for driving the vehicle forward or in reverse may be provided through a drive engager 26. For example, in the case where the wheels are hydrostatically driven, drive engager 26 communicates a hydraulic working fluid from hydraulic pump 32 to a hydrostatic drive unit operably connected to traversing means 16 and/or traversing means 54, drive the wheels either forward or rearward. An operator's instructions at steering control 20, whether a wheel, joy stick, or left and right hand controls, are communicated to rotary actuator 100. In the case where rotary actuator 100 is a hydraulic rotary actuator, steering control 20 may be an orbital power hydraulic steering unit as previously disclosed. Thus, the operator input at the steering control 20 causes working hydraulic fluid to be communicated from hydraulic pump 32 to hydraulic rotary actuator 100 to cause pivot bracket 104 to rotate clockwise or counter-clockwise which, in turn, articulates forward section 12 relative to rearward section 15 to provide for vehicle turning. Further, operator's instruction for operating working body controls 24 may be communicated by operation of solenoid valves whereby hydraulic working fluid is communicated to hydraulic cylinder 60 and 64 for operating working body 56. In the case where vehicle 10 is hydrostatically driven, a hydrostatic clutch and drive system may be attached to one or more of the wheels of vehicle 10 whereby hydraulic working fluid from hydraulic pump 30 is communicated to the hydraulic drive system for rotating wheels to drive vehicle 10 forward and in reverse.

The preferred embodiment of the present invention has been set forth in the drawings and in the specification and although specific terms are employed, these are used in the generically descriptive sense only and are not used for the purpose of limitation. Changes in the formed proportion of parts, as well as in the substitution of equivalents, are contemplated as circumstances may suggest or are rendered expedient without departing from the spirit and scope of the invention as further defined in the following claims.

What is claimed is:

1. A center-pivot vehicle comprising:
   a forward section having traversing means for traversing terrain;
   a rearward section having traversing means for traversing terrain;
   a rotary actuator having a pivot bracket connected to said forward section and an opposite side mounting bracket connected directly to said rearward sections; a spindle terminating in a ball, said spindle connected directly to said pivot bracket;
   a hub having a socket disposed therein, said hub connected directly to said forward section and said ball pivotably secured within said socket;
   wherein rotation of said pivot bracket articulates said forward and rearward sections relative to each other for steering said vehicle; and wherein said rearward and forward section pitch and roll relative to each other by pivotation of said ball in said socket.

2. The center-pivot vehicle of claim 1 further comprises an operator's station adapted for seating an operator, wherein:
   a. said forward section includes said operator's station; or
   b. said rearward section includes said operator's station.

3. The center-pivot vehicle of claim 2 wherein said operator's station further comprises a steering control in communication with said rotary actuator for communicating an operator's instructions to said rotary actuator for actuating said rotary actuator for turning said vehicle.

4. The center-pivot vehicle of claim 3 wherein said steering control comprises:
   a. a steering wheel;
   b. a joystick; or
   c. left and right hand controls.

5. The center-pivot vehicle of claim 1 wherein said rotary actuator comprises a hydraulic rotary actuator.

6. The center-pivot vehicle of claim 1 wherein said traversing means comprises:
   a. a track;
   b. a wheel; or
   c. a ski.

7. The center-pivot vehicle of claim 1 further comprises a working body, wherein:
   a. said forward section includes said working body; or
   b. said rearward section includes said working body.

8. The center-pivot vehicle of claim 7 wherein said working body comprises a flatbed.

9. The center-pivot vehicle of claim 7 wherein said working body comprises a box.

10. The center-pivot vehicle of claim 7 wherein said working body is hydraulically operated.

11. The center-pivot vehicle of claim 1 further comprises an engine and a hydraulic pump operated by said engine.

12. The center-pivot vehicle of claim 11 wherein said traversing means is hydrostatically driven by said hydraulic pump.

13. A center-pivot vehicle comprising:
   a first wheel supported section having an operator's station and an engine for operating a hydraulic pump;
   a second wheel supported section having a working body;
   a hydraulic rotary actuator connecting said first and second wheel supported sections together, said hydraulic rotary actuator powered by said hydraulic pump;
   a hydraulically operated bed connected to said working body, said bed having a trailing and loading position and said bed being parallel to and beneath said working body in said loading position; and
   wherein operator input at said operator's station causes said hydraulic rotary actuator to rotate whereby said first and second wheel supported sections articulate relative to each other for steering said vehicle.

14. The center-pivot vehicle of claim 13 wherein said operator's station further comprises a hydraulic steering unit in operable communication with said hydraulic pump and hydraulic rotary actuator.

15. The center-pivot vehicle of claim 13 wherein said hydraulically operated bed includes a hydraulic cylinder in operable communication with said hydraulic pump to move said bed between said trailing and loading position.

16. The center-pivot vehicle of claim 13 wherein the second wheel supported section includes a spindle terminating in a ball and said rotary actuator includes a hub comprising a socket connected together between said first or second wheel supported sections, wherein said first and second wheel supported sections pitch and roll relative to each other by pivotation of said ball in said socket.

17. A method for controlling articulation of a center-pivot vehicle comprising:
   providing a rotary actuator having a pivot bracket connected to a forward section of said vehicle and an opposite side mounting bracket connected directly to a rearward section of said vehicle;
   freely pitching and rolling said forward and rearward sections of said vehicle relative to each other by pivotably securing a spindle attached directly to said pivot bracket to a hub attached directly to said forward section;
   powering said rotary actuator by an engine associated with said first or second section;
   providing a steering input by an operator into said rotary actuator for rotating said rotary actuator; and
   articulating said first and second sections relative to the each other for steering said vehicle by rotating said pivot bracket.

18. The method of claim 17 wherein said spindle terminates in a ball, said huh includes a socket therein and said rearward section;
   a) rolling relative to said forward section by said ball rolling within said socket; and
   b) pitching relative to said forward section by said ball pitching within said socket.

19. The method of claim 18 further comprising operating a hydraulic steering unit for providing said steering input into said hydraulic rotary actuator.

* * * * *

UNITED STATES PATENT AND TRADEMARK OFFICE
CERTIFICATE OF CORRECTION

PATENT NO. : 8,002,074 B2  Page 1 of 1
APPLICATION NO. : 12/509838
DATED : August 23, 2011
INVENTOR(S) : Gerald L. Roose It is certified that error appears in the above-identified patent and that said Letters Patent is hereby corrected as shown below:

Column 6, Line 59
DELETE: after rearward "sections"
ADD: after rearward --section--

Signed and Sealed this
Fourth Day of October, 2011

David J. Kappos
*Director of the United States Patent and Trademark Office*